United States Patent
Nakamura

(10) Patent No.: US 7,075,780 B2
(45) Date of Patent: Jul. 11, 2006

(54) SUPPORT STRUCTURE OF CONTROL BOARD

(75) Inventor: Motoyasu Nakamura, Nagano-ken (JP)

(73) Assignee: Nissin Kogyo Co., Ltd., Ueda (JP)

( * ) Notice: Subject to any disclaimer, the term of this patent is extended or adjusted under 35 U.S.C. 154(b) by 232 days.

(21) Appl. No.: 10/612,413

(22) Filed: Jul. 3, 2003

(65) Prior Publication Data

US 2004/0074536 A1     Apr. 22, 2004

(30) Foreign Application Priority Data

Jul. 5, 2002     (JP)     ............ P.2002-196756

(51) Int. Cl.
  *H02B 1/01*     (2006.01)
(52) U.S. Cl. ..................................... 361/627
(58) Field of Classification Search ............... 361/601, 361/622, 627, 641, 644, 740, 747, 759, 59; 439/76.2; 174/138 D, 138 E, 138 G
See application file for complete search history.

(56) References Cited

U.S. PATENT DOCUMENTS

| | | | | |
|---|---|---|---|---|
| 3,836,704 | A | * | 9/1974 | Coules ................ 174/138 D |
| 4,604,776 | A | * | 8/1986 | Takahashi .................. 24/453 |
| 4,970,761 | A | * | 11/1990 | Nakamura .................. 24/453 |
| 5,963,432 | A | * | 10/1999 | Crowley ..................... 361/804 |
| 6,377,445 | B1 | * | 4/2002 | Davis et al. ............... 361/683 |
| 6,390,829 | B1 | * | 5/2002 | Rademacher ................ 439/74 |
| 6,418,028 | B1 | * | 7/2002 | Nariyama .................. 361/759 |

FOREIGN PATENT DOCUMENTS

| | | |
|---|---|---|
| JP | 62-005691 | 1/1987 |
| JP | 63-038392 | 3/1988 |
| JP | 1-174795 | 12/1989 |
| JP | 5-021482 | 3/1993 |
| JP | 5-167273 | 7/1993 |
| JP | A-5-167273 | 7/1993 |
| JP | 8054080 | 2/1996 |
| JP | 11-135967 | 5/1999 |
| JP | 2001-007574 | 1/2001 |

OTHER PUBLICATIONS

Office Action, Jun. 3, 2005, Japan.
English Language Abstract of JP 11-135967.
English Language Abstract of JP 2001-007574.

* cited by examiner

*Primary Examiner*—Kamand Cuneo
*Assistant Examiner*—Ivan Carpio
(74) *Attorney, Agent, or Firm*—Greenblum & Bernstein, P.L.C.

(57) ABSTRACT

A support structure of a control board has a control board including a plurality of attaching holes disposed at respective corners of an imaginary polygon; a support member for supporting the control board; and a plurality of support bosses disposed on the support member, a plurality of support bosses each having a support portion in contact with one face of the control board, and an engaging portion inserted into the attaching hole and engaged with other face of the control board, wherein each of the engaging portions is formed with a split groove in a shape of a straight line opened at a front end thereof and the respective support bosses are provided at the support member by avoiding the split grooves of the support bosses disposed at two ends of straight lines connecting the corners of the imaginary polygon from being disposed on the same straight lines.

7 Claims, 9 Drawing Sheets

SUPPORT STRUCTURE OF CONTROL BOARD

BACKGROUND OF THE INVENTION

1. Field of the Invention

The present invention relates to a support structure of a control board in which a control board is provided with a plurality of attaching holes disposed at respective corners of an imaginary polygon and a supporting member made of a synthetic resin for supporting the control board is provided with a plurality of support bosses each having a supporting portion which is brought into contact with one face of the control board and an engaging portion which is inserted into the attaching hole and engaged with other face of the control board in correspondence with the respective attaching holes.

2. Description of the Related Art

Such a support structure is known in, for example, JP-A-8-54080 or the like and according thereto, there is constructed a constitution in which in a brake hydraulic control apparatus for a vehicle, a control board contained at inside of an ECU body is supported by the ECU body by forcibly inserting wedge portions of front ends of a plurality of support bosses integrally provided with the ECU body into attaching holes provided at a control board.

Meanwhile, when soldering is carried out for electrically connecting a connection terminal to an electric circuit on a control board, expansion is brought about by temperature rise of the control board. In order to prevent excessive load from operating to either of the control board and the ECU body in the expansion, according to the above-described conventional support structure, when temperature of the control board is lowered, play of the control board is produced by producing a comparatively large clearance between the support boss and the control board and when such a play is avoided, excessive load is operated to the control board and the ECU body in the expansion.

SUMMARY OF THE INVENTION

The invention has been carried out in view of such a situation and it is an object thereof to provide a support structure of a control board capable of stably supporting the control board without play while preventing excessive load from operating to either of the control board and a supporting member by absorbing thermal expansion of the control board.

In order to achieve the above-described object, the present invention is provided that a support structure of a control board having: a control board including a plurality of attaching holes disposed at respective corners of an imaginary polygon; a support member made of a synthetic resin for supporting the control board; and a plurality of support bosses disposed on the support member in correspondence with the respective attaching holes, a plurality of support bosses each having a support portion in contact with one face of the control board, and an engaging portion inserted into the attaching hole and engaged with other face of the control board, wherein each of the engaging portions is formed with a split groove in a shape of a straight line opened at a front end thereof and the respective support bosses are provided at the support member by avoiding the split grooves of the support bosses disposed at two ends of straight lines connecting the corners of the imaginary polygon from being disposed on the same straight lines.

In this construction, it is preferable that the imaginary polygon is quadrangle, when notations P1, P2, P3 and P4 are attached at positions of the respective corners of the imaginary quadrangle on the control board successively in a peripheral direction, the support boss at the corner position P1 is provided on the support member in an attitude by which the split groove is made to be orthogonal to a diagonal line connecting the corner positions P1 and P3, the support boss at the corner position P2 is provided on the support member in an attitude by which the split groove is made to be orthogonal to a diagonal line connecting the corner positions P2 and P4, the support boss at the corner position P3 is provided on the support member in an attitude by which the split groove is made to be along a straight line connecting the corner positions P2 and P3 or a straight line connecting the corner positions P3 and P4, and the support boss at the corner position P4 is provided on the support member in an attitude by which the split groove is made to be along a straight line connecting the corner positions P4 and P1 or a straight line connecting the corner positions P3 and P4.

It is also preferable that the imaginary polygon is quadrangle, four of support bosses are provided on the support member in attitudes of avoiding the split grooves of pairs of the support bosses disposed at two ends of straight lines connecting the respective corners of the imaginary quadrangle from being disposed on the same straight lines.

It is also preferable that the imaginary polygon is triangle, three of the support bosses are provided on the support member in attitudes of avoiding the split grooves of pairs of the support bosses disposed at two ends of straight lines connecting the corners of the imaginary triangle from being disposed on the same straight lines.

It is also preferable that the imaginary polygon is pentagon, five of the support bosses are provided on the support member in attitudes of avoiding the split grooves of pairs of the support bosses disposed at two ends of straight lines connecting respective corners of the imaginary pentagon from being disposed on the same straight lines.

According to the constitution, the engaging portion provided at each of the support bosses can be bent in a direction of narrowing or expanding a width of the split groove and therefore, in the imaginary polygon arranged with the plurality of attaching holes provided at the control board at the respective corners, expansion of the control board in directions along the straight lines connecting the respective corners is allowed. Therefore, excessive load can be prevented from operating to either of the control board and the support member by absorbing thermal expansion when the control board is thermally expanded while stably supporting the control board without play at ordinary temperature.

DETAILED DESCRIPTION OF THE PREFERRED EMBODIMENTS

A mode for carrying out the invention will be explained based on embodiments of the invention shown in the attached drawings as follows.

Figure 1:
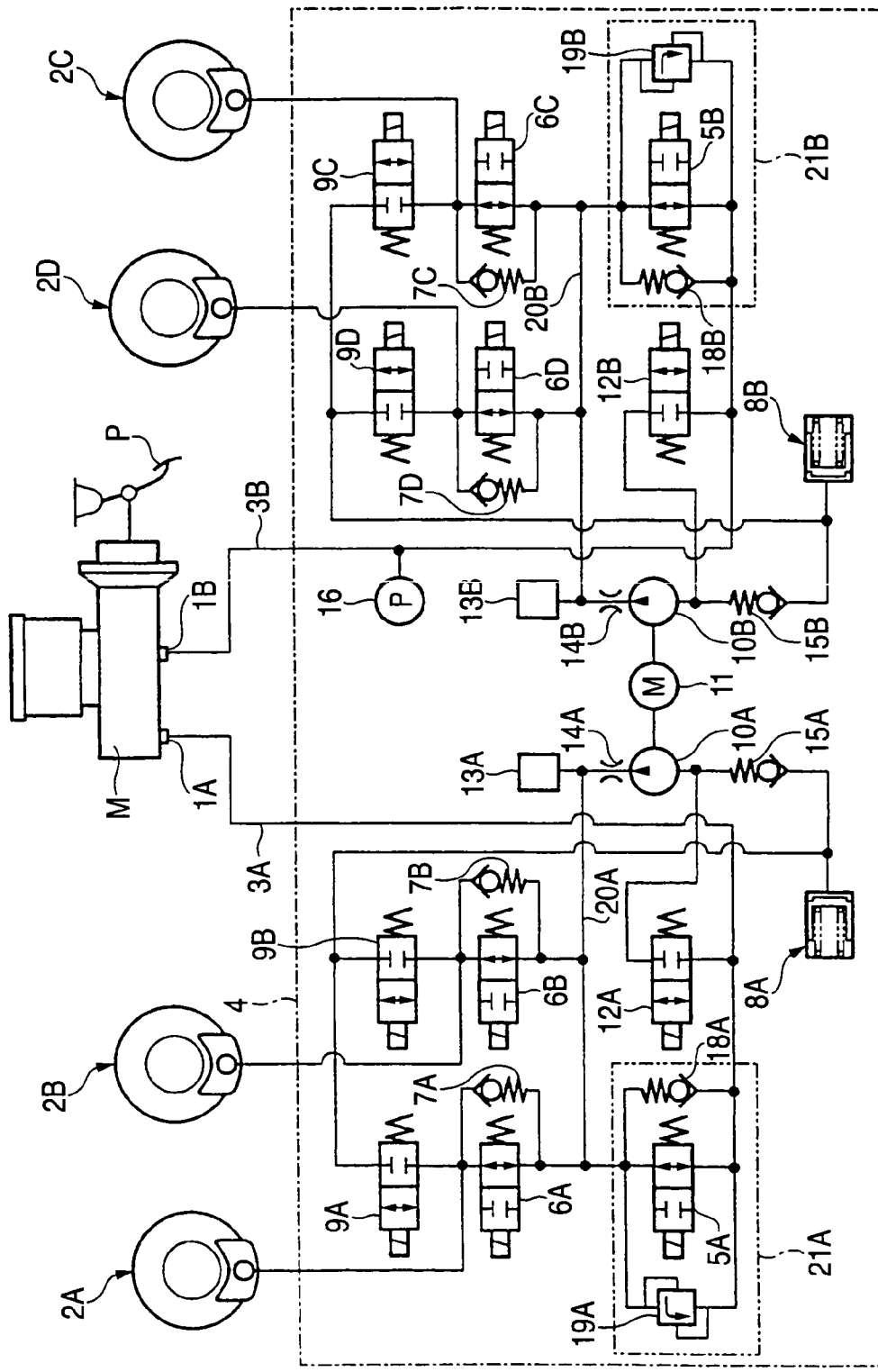
FIG. 1 is a hydraulic circuit diagram of a brake apparatus for a vehicle according to a first embodiment.
Figure 2:
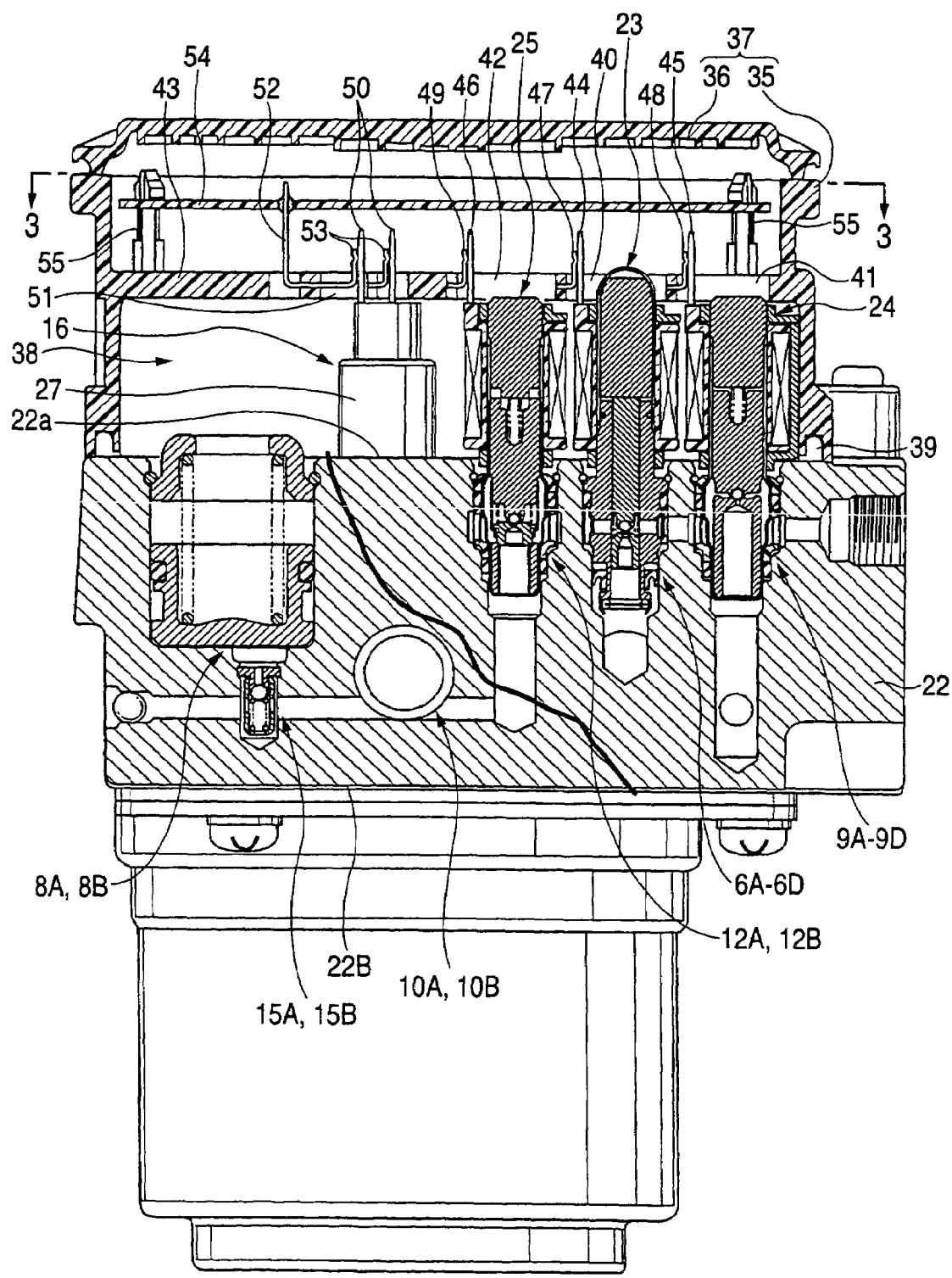
FIG. 2 is a sectional view showing a state of attaching a brake hydraulic pressure control apparatus to a base member.
Figure 3:
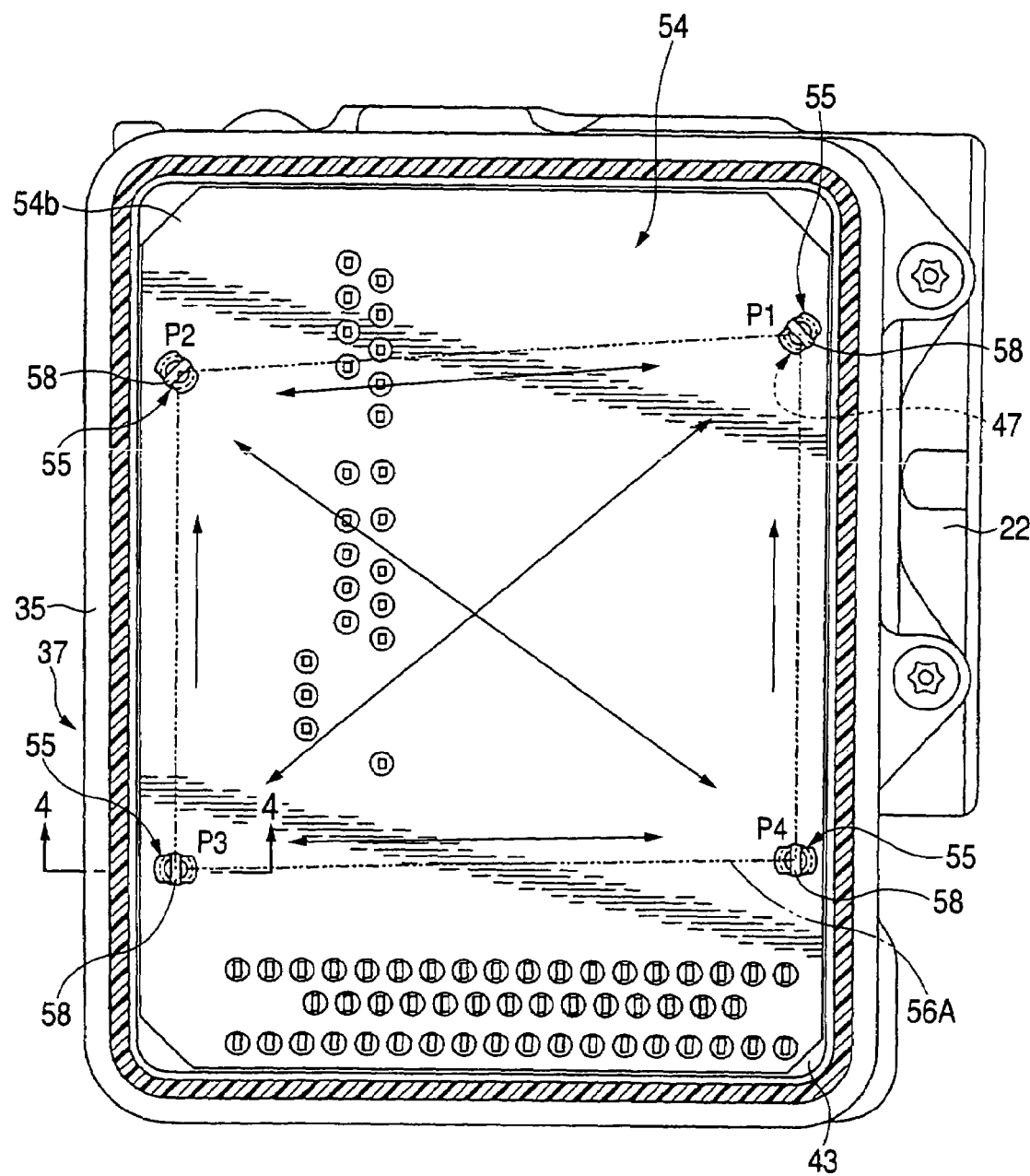
FIG. 3 is a sectional view taken long a line 3—3 of FIG. 2.
Figure 4:
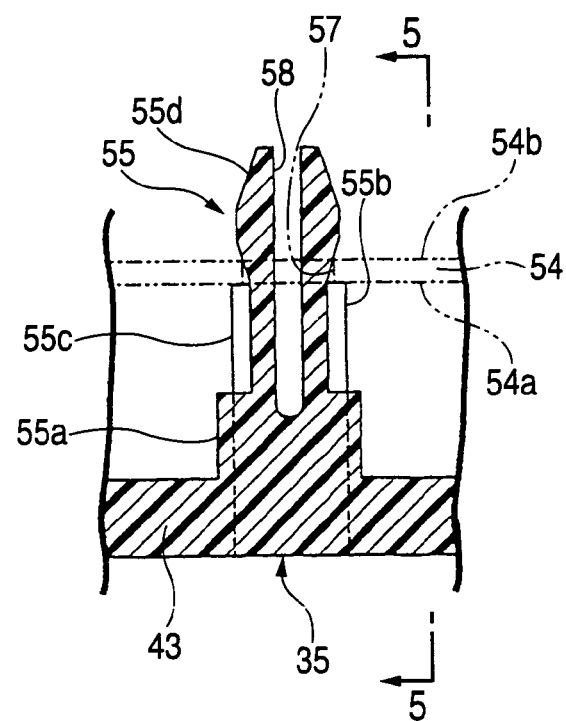
FIG. 4 is an enlarged sectional view taken along a line 4—4 of FIG. 3.
Figure 5:
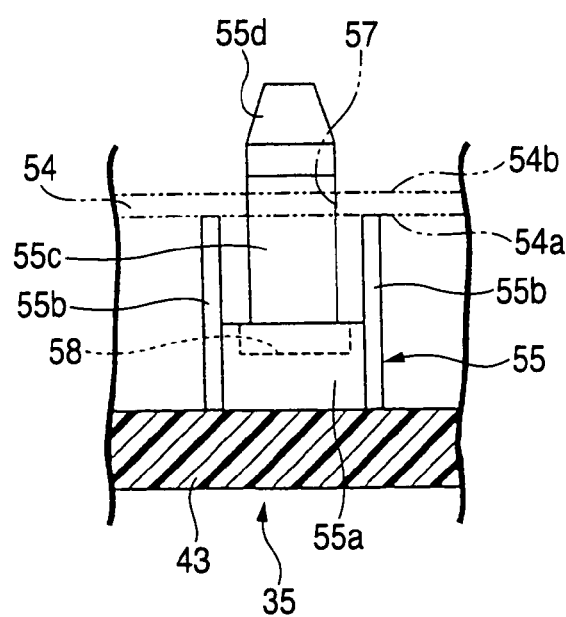
FIG. 5 is a sectional view taken along a line 5—5 of FIG. 4.

FIG. 1 through FIG. 5 show a first embodiment of the invention, FIG. 1 is a hydraulic circuit diagram of a brake apparatus for a vehicle, FIG. 2 is a sectional view showing a state of attaching a brake hydraulic pressure control apparatus to a base member, FIG. 3 is a sectional view taken along a line 3—3 of FIG. 2, FIG. 4 is an enlarged sectional view taken along a line 4—4 of FIG. 3 and FIG. 5 is a sectional view taken along a line 5—5 of FIG. 4.

First, in FIG. 1, a master cylinder M of a tandem type is provided with a first and a second output port 1A and 1B for generating brake hydraulic pressure in accordance with depressing force exerted to a brake pedal by a vehicle driver and a brake hydraulic pressure control apparatus 4 is provided between a first and a second output hydraulic pressure path 3A and 3B individually connected to a wheel brake for a left front wheel 2A, a wheel brake for a right rear wheel 2B, a wheel brake for a right front wheel 2C and a wheel brake for a left rear wheel 2D and the first and the second output ports 1A and 1B.

The brake hydraulic pressure control apparatus 4 is provided with normally open type electromagnetic valves 6A and 6B respectively provided between a hydraulic path 20A in correspondence with the first output hydraulic pressure path 3A and the wheel brake for a left front wheel 2A and the wheel brake for a right wear wheel 2B, normally open type electromagnetic valves 6C and 6D respectively provided between a hydraulic path 20B in correspondence with the second output hydraulic path 3B and the wheel brake for a right front wheel 2C and the wheel brake for a left rear wheel 2D, check valves 7A, 7B, 7C and 7D connected in parallel with the normally open type electromagnetic valves 6A through 6D to allow a brake fluid to flow to the sides of the brake pressure paths 20A and 20B, a first and a second reservoir 8A and 8B respectively in correspondence individually with the first and the second output hydraulic pressure paths 3A and 3B, normally closed type electromagnetic valves 9A and 9B respectively provided between the first reservoir 8A and the wheel brake for a left front wheel 2A and the wheel brake for a right rear wheel 2B, normally closed type electromagnetic valves 9C and 9D respectively provided between the second reservoir 8B and the wheel brake for a right front wheel 2C and the wheel brake for a left rear wheel 2D, a first and a second pump 10A and 10B intake sides of which are connected to the first and the second reservoirs 8A and 8B and delivery sides of which are connected to the hydraulic paths 20A and 20B, a single piece of common electric motor 11 for driving the two pumps 10A and 10B, normally closed type electromagnetic valves 12A and 12B respectively interposed between the first and the second output hydraulic pressure paths 3A and 3B and the intake sides of the first and the second pumps 10A and 10B, a first and a second damper 13A and 13B respectively interposed between the delivery sides of the first and the second pumps 10A and 10B and the hydraulic pressure paths 20A and 20B, a first and a second orifice 14A and 14B respectively provided between the first and the second pumps 10A and 10B and the first and the second dampers 13A and 13B, check valves 15A and 15B interposed between the first and the second pumps 10A and 10B and the first and the second reservoirs 8A and 8B to allow the brake fluid to flow to the sides of the respective pumps 10A and 10B, a pressure sensor 16 attached to the second output hydraulic pressure path 3B, regulators 21A and 21B respectively provided between the first and the second output hydraulic pressure paths 3A and 3B and the hydraulic pressure paths 20A and 20B.

The normally closed type electromagnetic valves 12A and 12B are respectively provided between the first and the second pumps 10A and 10B and the check valves 10A and 10B and the hydraulic pressure paths 20A and 20B.

The regulators 21A and 21B are constituted by connecting in parallel with normally open type electromagnetic valves 5A and 5B, one way valves 18A and 18B and relief valves 19A and 19B between the first and the second output hydraulic pressure paths 3A and 3B and the hydraulic pressure paths 20A and 20B.

The one way valves 18A and 18B are connected in parallel with the normally open type electromagnetic valves 5A and 5B to allow the brake fluid to flow only from the sides of the first and the second output hydraulic pressure paths 3A and 3B. Further, the relief valves 19A and 19B are connected in parallel with the normally open type electromagnetic valves 5A and 5B to open in accordance with the hydraulic pressure of the hydraulic pressure paths 20A and 20B to be equal to or larger than a predetermined value.

Although the regulators 21A and 21B communicate the first and the second output hydraulic pressure paths 3A and 3B communicating to the master cylinder M and the hydraulic pressure paths 20A and 20B, when the normally closed type electromagnetic valves 12A and 12B are opened, the regulators 21A and 21B are operated to escape the hydraulic pressure of the hydraulic pressure paths 20A and 20B to the side of the master cylinder M in accordance with the hydraulic pressure of the hydraulic pressure paths 20A and 20B to be equal to or larger than the set value while cutting off intervals of the output hydraulic pressure paths 3A and 3B and the hydraulic pressure paths 20A and 20B to thereby control the hydraulic pressure of the hydraulic pressure paths 20A and 20B to be equal to or lower than the set value.

Further, the pressure sensor 16 detects whether the hydraulic pressure is outputted from the master cylinder M, that is, whether the brake pedal P is depressed and is used in skidding control and traction control of the vehicle and a control of a rotational number of the electric motor 11 in accordance with the outputted hydraulic pressure of the mask cylinder M.

Meanwhile, in the brake hydraulic pressure control apparatus 4, in normal brake time having no possibility of locking the respective wheels, in a state in which the normally open type electromagnetic valves 5A and 5B are deactivated to open and the normally closed type electromagnetic valves 12A and 12B are deactivated to close, the normally open type electromagnetic valves 6A through 6D are brought into a state of deactivating to open and the respective normally closed type electromagnetic valves 9A through 9D are brought into a state of deactivating to close. Thereby, the master cylinder M and the wheel brakes 2A through 2D are communicated with each other and the wheel brakes 2A through 2D and the reservoirs 8A and 8B are cut from each other. Therefore, the brake hydraulic pressure outputted from the first output port 1A of the master cylinder M is operated to the wheel brakes for a left front wheel and a right rear wheel 2A and 2B via the normally open type electromagnetic valve 5A and the normally open type electromagnetic valves 6A and 6B. Further, the brake hydraulic pressure outputted from the second output port 1B of the master cylinder M is operated to the wheel brakes for a right front wheel and a left rear wheel 2C and 2D via the normally open type electromagnetic valve B and the normally open type electromagnetic valves 6C and 6D.

When a wheel is going to be brought into a lock state in the braking, a normally open type electromagnetic valve in correspondence with the wheel which is going to be brought into the lock state in the normally open type electromagnetic valves 6A through 6D is activated to close and a normally closed type electromagnetic valve in correspondence with the wheel in the normally closed type electromagnetic valves 9A through 9D is activated to open. Thereby, the master cylinder M and the wheel brakes 2A through 2D are cut from each other at a portion in correspondence with the wheel which is going to be brought into the lock state and the wheel brakes 2A through 2D and the reservoirs 8A and 8B are communicated with each other. Therefore, a portion of the brake hydraulic pressure of the wheel which is going to be brought into the lock state is absorbed by the first reservoir 8A or the second reservoir 8B and the brake hydraulic pressure of the wheel which is going to be brought into the lock state is reduced.

Further, when the brake hydraulic pressure is maintained constant, the normally open type electromagnetic valves 6A through 6D are activated to close and the normally closed type electromagnetic valves 9A through 9D are deactivated to close to thereby cut the wheel brakes 2A through 2D from the master cylinder M and the reservoirs 8A and 8B.

Further, when the brake hydraulic pressure is increased, the normally open type electromagnetic valves 6A through 6D are brought into a state of deactivating to open, the normally open type electromagnetic valves 9A through 9D are brought into a state of deactivating to close to thereby communicate the master cylinder M and the wheel brakes 2A through 2D with each other and cut the wheel brakes 2A through 2D and the reservoirs 8A and 8B from each other.

In this way, in a state in which the normally open type electromagnetic valves 5A and 5B are deactivated to open and the normally closed type electromagnetic valves 12A and 12B are deactivated to close, by controlling to deactivate and activate the respective normally open type electromagnetic valves 6A through 6D and the respectively normally closed type electromagnetic valves 9A through 9D, the wheels can efficiently be braked without locking.

Meanwhile, in the above-described antilock braking control, the electric motor 11 is operated to rotate, the first and the second pumps 10A and 10B are driven in accordance with operation of the electric motor 11 and therefore, the brake fluid absorbed to the first and the second reservoirs 8A and 8B is sucked into the first and the second pumps 10A and 10B and successively recirculated to the first and the second output hydraulic pressure paths 3A and 3B via the first and the second dampers 13A and 13B. By recirculating the brake fluid in this way, an increase in an amount of depressing the brake pedal P by absorbing the brake fluid of the first and the second reservoirs 8A and 8B can be prevented. Further, pulsation of delivery pressure of the first and the second pumps 10A and 10B is restrained by operation of the first and the second dampers 13A and 13B and the first and the second orifices 14A and 14B and operational feeling of the brake pedal P is not hampered by the recirculation.

Further, the brake hydraulic pressure control apparatus 4 can carry out skidding control or traction control of the vehicle in a state of not operating the brake in addition to the above-described antilock brake control.

Further, for example, in skidding control, the normally open type electromagnetic valves 5A and 5B of the regulators 21A and 21B are activated to close and the normally closed type electromagnetic types 12A and 12B are activated to open, further, the first and the second pumps 10A and 10B are driven by operating the electric motor 11 and normally open type electromagnetic valves other than normally open type electromagnetic valves in correspondence with wheels intended to brake in the respective normally open type electromagnetic valves 6A through 6D are activated to close.

Thereby, the two pumps 10A and 10B suck the brake fluid of the master cylinder M from the first and the second output ports 1A and 1B via the first and the second output hydraulic pressure paths 3A and 3B and the normally open type electromagnetic valves 12A and 12B, the brake fluid is supplied to wheel brakes selected from the respective wheel brakes 2A through 2D via opened normally open type electromagnetic valves in the normally open type electromagnetic valves 6A through 6D and the brake fluid is hampered from flowing back to the side of the master cylinder M by closing the normally open type electromagnetic valves 5A and 5B.

In the skidding control or the traction control, when the hydraulic pressure of the hydraulic pressure paths 20A and 20B operated with the hydraulic pressure delivered from the first and the second pumps 10A and 10B becomes equal to or larger than the set value, an excessive amount of the hydraulic pressure is escaped to the side of the master cylinder M by the relief valves 19A and 19B of the regulators 21A and 21B and excessive hydraulic pressure is avoided from operating to wheel brakes operated with brake pressure.

Further, since the dampers 13A and 13B are interposed between the hydraulic paths 20A and 20B and the orifices 14A and 14B, pulsation produced at the hydraulic pressure paths 20A and 20B by operating the regulators 21A and 21B can be absorbed by the dampers 13A and 13B and emittance of operating sound caused by pulsation by operating the regulators 21A and 21B can be restrained.

In FIG. 2, the brake hydraulic pressure control apparatus 4 is provided at a base member 22 formed in a block-like shape by, for example, an aluminum alloy or the like, at the base member 22, the normally open type electromagnetic valve 6A through 6D including the check valves 7A through 7D, the respective normally closed type electromagnetic valves 9A through 9D and the normally closed type electromagnetic valves 12A and 12B are attached to the base member 22 such that solenoid portions 23 . . . , 24 . . . , 25 . . . thereof are projected from one face 22a of the base member 22, and the normally open type electromagnetic valves 5A and 5B including the one way valves 18A and 18B and the relief valves 19A and 19B to constitute the regulators 21A and 21B in cooperation with the one way valves 18A and 18B and the relief valves 19A and 19B are attached to the base member 22 to align with the normally closed type electromagnetic valves 12A and 12B while projecting solenoid portions thereof from the one face 22a of the base member 22 although not illustrated.

The electric motor 11 is attached to other face 22b of the base member 22 and the first and the second pumps 10A and 10B driven by the electric motor 11 are included in the base member 22. Further, the first and the second reservoirs 8A and 8B are provided at the base member 22 such that portions thereof are projected from the one face 22a, the first and the second check valves 15A and 15B are provided at the base member 22 to be interposed between the first and the second reservoirs 8A and 8B and the first and the second pumps 10A and 10B, and the first and the second dampers 13A and 13B and the first and the second orifices 14A and 14B are included in the base member 22 although not illustrated.

The one face 22a of the base member 22 are fastened with a cover 37 constituted by oscillatingly welding a second resin mold member 36 for closing one end opening portion of a first resin mold member 35 at one end of the first resin mold member 35 formed in a cylindrical shape having a cross-sectional face in a rectangular shape. The cover 37 contains the solenoid portions 23 . . . of the normally open type electromagnetic valves 6A through 6D, the solenoid portions 24 . . . of the normally closed type electromagnetic valves 9A through 9D, the solenoid portions 25 . . . of the normally closed type electromagnetic valves 12A and 12B and the solenoid portions of the normally open type electromagnetic valves 5A and 5B and is fastened to the one face 22a of the base member 22 to form a containing chamber 38 for containing portions of the first and the second reservoirs 8A and 8B and a portion of the pressure sensor 16 between the cover 37 and the base member 22. Further, an end edge of the cover 37 on a side of the base member 22 is mounted with a seal member 39 in an endless shape which is brought into elastic contact with the one face 22a of the base member 22.

A middle portion at inside of the first resin mold member 35 in the cover 37 is integrally formed with a wall portion 43 in a plane shape having opening portions 40 . . . , 41 . . . and 42 . . . respectively in correspondence individually with the solenoid portions 23 . . . of the normally open type electromagnetic valves 6A through 6D, the solenoid portions 24 . . . of the normally closed type electromagnetic valves 9A through 9D, the solenoid portions 25 . . . of the normally closed type electromagnetic valves 12A and 12B and the solenoid portions of the normally open type electromagnetic valves 5A and 5B to be opposed to the one face 22a of the base member 22.

Front end portions of the respective solenoid portions 23 . . . , 24 . . . and 25 . . . are inserted into the opening portions 40 . . . , 41 . . . and 42 . . . and electromagnetic valve side connection terminals 44 . . . , 45 . . . and 46 . . . projected in pairs from the respective solenoid portions 23 . . . , 24 . . . and 25 . . . are projected to extend upwardly at insides of the respective opening portions 40 . . . , 41 . . . and 42 . . . .

The wall portion 43 is embedded with individual bus bars (not illustrated) made of a conductive metal respectively in correspondence individually with the normally open type electromagnetic valves 6A through 6D, the normally closed type electromagnetic valves 9A through 9D, the normally open type electromagnetic valves 5A and 5B and the normally closed type electromagnetic valves 12A and 12B and a single common bus bar (not illustrated) made of a conductive metal commonly in correspondence with the electromagnetic valves 6A through 6D, 9A through 9D, 5A, 5B, 12A and 12B.

One-sides of the electromagnetic valve side connection terminals 44 . . . , 45 . . . and 46 . . . are respectively electrically connected with individual bus bar side connection terminals 47 . . . , 48 . . . and 49 . . . formed at one-ends of the respective individual bus bars and other sides of the electromagnetic valve side connection terminals 44 . . . , 45 . . . and 46 . . . are respectively electrically connected with a plurality of common bus bar side connection terminals (not illustrated) formed at the common bus bar.

Three pieces of pressure sensor side connection terminals 50 . . . are projected from the pressure sensor 16. Meanwhile, the wall portion 43 of the cover 37 is provided with an opening portion 51 in correspondence with the pressure sensor 16 and the pressure sensor side connection terminals 50 . . . are projected from the pressure sensor 16 to extend upwardly at inside of the opening portion 51. Further, the wall portion 43 is embedded with three pieces of bus bars 52 . . . made of a conductive metal in correspondence with the pressure sensor 16 and bus bar side connection terminals 53 . . . formed at one-ends of the respective bus bars 52 . . . are respectively electrically connected to the pressure sensor side connection terminals 50 . . . .

A control board 54 provided with an electric circuit is arranged at inside of the cover 37 above the wall portion 43 and the control board 54 is fixedly supported above a plurality of support boss portions 55 . . . projected from the wall portion 43.

Further, the individual bus bars and the common bus bar in correspondence with the normally open type electromagnetic valves 6A through 6D, the normally closed type electromagnetic valves 9A through 9D, the normally open type electromagnetic valves 5A and 5B and the normally closed type electromagnetic valves 12A and 12B are electrically connected to the electric circuit on the control board 54. Further, other ends of the bus bars 52 . . . in correspondence with the pressure sensor 16 are electrically connected to the electric circuit on the control board 54 to penetrate the control board 54.

In FIG. 3 through FIG. 5, the control board 54 is formed in, for example, a rectangular shape to be contained in the first resin mold member 35 in the cylindrical shape having the cross-sectional face in the rectangular shape and a plurality of, for example, four of attaching holes 57 . . . are provided at the control board 54 to dispose at respective corners of an imaginary polygon, for example, an imaginary quadrangle 56A drawn on the control board 54.

Meanwhile, the wall portion 43 integral with the first resin mold member 35 is integrally provided with the support bosses 55 . . . in correspondence with the respective attaching holes 57 . . . . Further, the support boss 55 is provided with a base portion 55a having a shape of a cross-sectional shape in a rectangular shape and projected from the wall portion 43 to a side of the control board 54, a pair of support portions 55b, 55b projected from the wall portion 43 to the side of the control board 54 and brought into contact with one face 54a of the control board 54 by making a projected amount thereof larger than that of the base portion 55a at positions interposing the base portion 55a from two sides, a neck portion 55c projected from the base portion 55a to the side of the control board 54, and an engaging portion 55d provided continuous to a front end of the neck portion 55c to engage with other face 54b by being inserted into the attaching hole 57.

Further, a split groove 58 in a shape of a straight line opened to a front end of the engaging portion 55d is provided at an interval reaching the base portion 55a from the engaging portion 55d via the neck portion 55c.

According to the support boss 55, the engaging portion 55d can be bent in a direction of narrowing or expanding a width of the split groove 58 and therefore, in inserting to the attaching hole 57, the engaging portion 55d can easily be inserted to the attaching hole 57 by bending the engaging portion 55d to narrow the width of the split groove 58 and the engaging portion 55d inserted into the attaching hole 57 is elastically engaged with the other face 54b of the control board 54.

Meanwhile, the four support bosses 55 . . . are provided at wall portion 43 of the first resin mold member 35 in attitudes thereof to avoid the split grooves 58, 58 of a pair of the support bosses 55, 55 disposed at two ends of a straight line connecting the respective corners of the imaginary quadrangle 56a on the control board 54 from being disposed on the same straight line.

Here, when notations P1, P2, P3 and P4 are attached at positions of the respective corners of the imaginary quadrangle 56A on the control board 54 successively in a peripheral direction as shown by FIG. 3, according to the first embodiment, the support boss 55 at the corner position P1 is provided at the wall portion 43 of the first resin mold member 35 in an attitude by which the split groove 58 is made to be orthogonal to a diagonal line connecting the corner positions P1 and P3, the support boss 55 at the corner position P2 is provided at the wall portion 43 of the first resin mold member 35 in an attitude by which the split groove 58 is made to be orthogonal to a diagonal line connecting the corner positions P2 and P4, the support boss 55 at the corner position P3 is provided at the wall portion 43 of the first resin mold member 35 in an attitude by which the split groove 58 is made to be along a straight line connecting the corner positions P2 and P3, and the support boss 55 at the corner position P4 is provided at the wall portion 43 of the first resin mold member 35 in an attitude by which the split groove 58 is made to be along a straight line connecting the corner positions P4 and P1.

According to the attitudes of the respective support bosses 55 . . . , expansion and contraction of the control board 54 are allowed in directions along straight lines connecting the respective corners of the imaginary quadrangle 56A which is an imaginary polygon, that is, along four sides and diagonal lines of the imaginary quadrangle 56A as shown by arrow marks of FIG. 3.

Next, explaining operation of the first embodiment in supporting the control board 54 above the wall portion 43 of the first resin mold member 35, the control board 54 is provided with the four attaching holes 57 . . . disposed at the respective corners of the imaginary quadrangle 56, the support bosses 55 . . . provided at the wall portion 43 in correspondence with the respective attaching holes 57 . . . include pairs of the support portions 55b, 55b brought into contact with the one face 54a of the control board 54, and the engaging portions 55d inserted into attaching holes 57 and engaged with the other face 54b of the control board 54 and the engaging portions 55d are respectively formed with the split grooves 58 in the shape of the straight line opened at the front ends.

Therefore, the engaging portion 55d can be bent in the direction of narrowing and expanding the width of the split groove 58 and in inserting the engaging portion 55d to the attaching hole 57, the engaging portion 55d can easily be inserted into the attaching hole 57 by bending the engaging portion 55d to narrow the width of the split groove 58 and the engaging portion 55d inserted to the attaching hole 57 is elastically engaged with the other face 54b of the control board 54.

Further, the respective support bosses 55 . . . are provided at the wall portion 43 in the attitudes of avoiding the split grooves 58, 58 of pairs of the support bosses 55, 55 disposed on the straight lines connecting the corners of the imaginary quadrangle 56A from being disposed on the same straight lines.

Therefore, when the control board 54 is supported by the respective support bosses 55 . . . , as shown by arrow marks of FIG. 3, the control board 54 can be expanded and contracted in directions along the straight lines connecting the corners of the imaginary quadrangle 56A. Therefore, even when expansion by temperature rise of the control board 54 is brought about by soldering or the like for electrically connecting the connection terminal to the electric circuit on the control board 54, at inside of the imaginary quadrangle 56A arranged with the respective support bosses 55 . . . , expansion and contraction of the control board 54 are allowed in the directions designated by the arrow marks of FIG. 3 and therefore, in the expansion, excessive load is not operated to either of the control board 54 and the first resin mold member 35. Further, in an ordinary state in which expansion is not brought about in the control board 54, by elastic engagement of the engaging portion 55d, the control board 54 can stably be supported by the respective support bosses 55 . . . without play.

Figure 6:
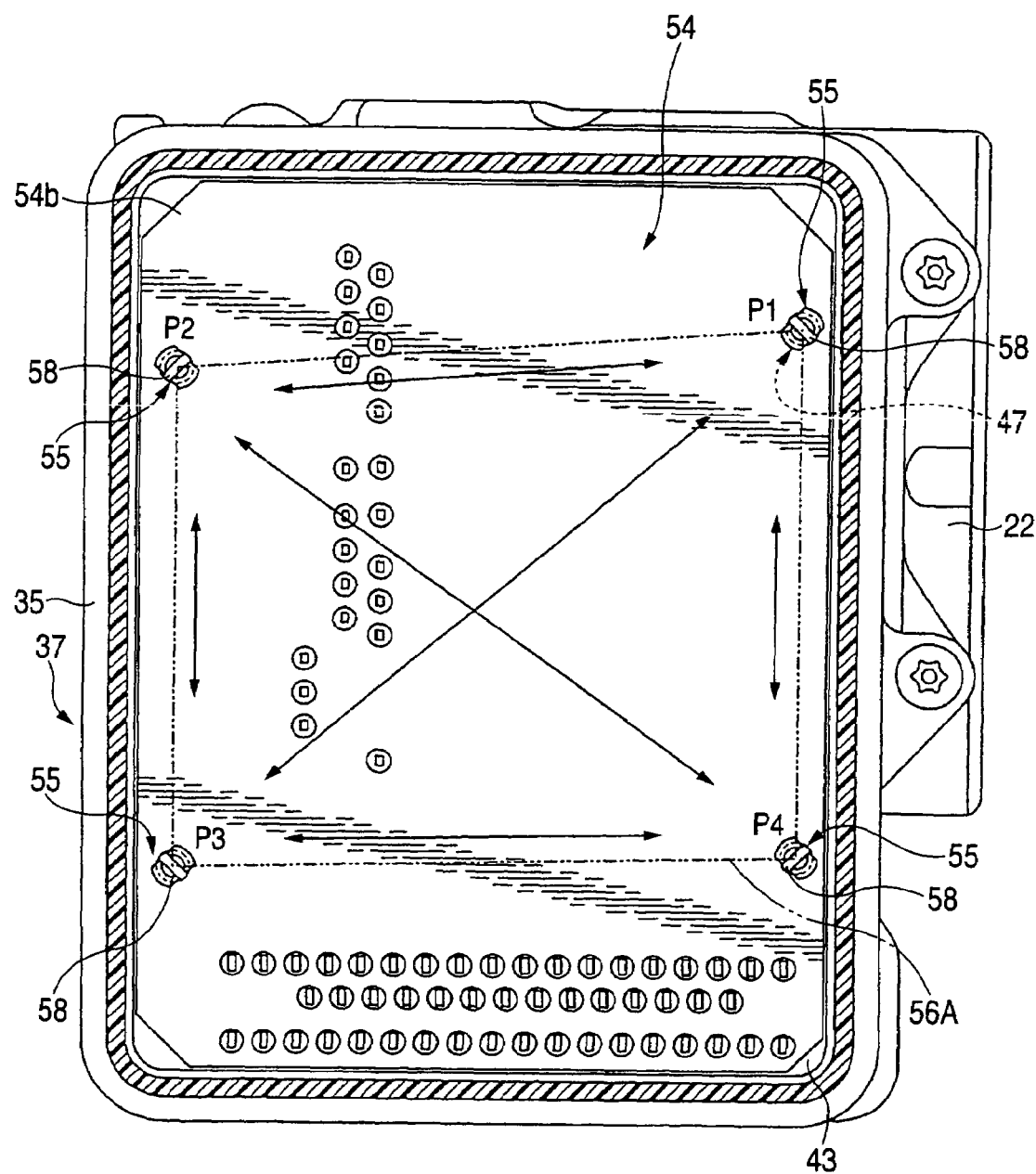
FIG. 6 is a sectional view in correspondence with FIG. 3 of a second embodiment.

FIG. 6 shows a second embodiment of the invention and portions thereof in correspondence with those of the first embodiment are attached with the same reference notations.

The four support bosses 55 . . . for supporting the control board 54 are provided at the wall portion 43 of the first resin mold member 35 in attitudes of avoiding the split grooves 58, 58 of the support bosses 55, 55 disposed at two ends of straight lines connecting the respective corners of the imaginary quadrangle 56A on the control board 54 from being disposed on the same straight lines and according to the second embodiment, the support bosses 55 . . . of the respective corner positions P1 through P4 of the imaginary quadrangle 56A are provided at the wall portion 43 of the first resin board member 35 in attitudes by which the slit grooves 58 . . . are made to be orthogonal to the diagonal lines of the imaginary quadrangle 56A in correspondence with the support bosses 55 . . . .

According to the second embodiment, expansion and contraction of the control board 54 are allowed in directions designated by arrow marks of FIG. 6 on the straight lines connecting the corners of the imaginary quadrangle 56A, that is, the respective sides and the diagonal lines of the imaginary quadrangle 56A and similar to the first embodiment, the control board 54 can stably be supported without play while preventing excessive load from operating to either of the control board 54 and the first resin mold member 35 by absorbing thermal expansion of the control board 54.

Figure 7:
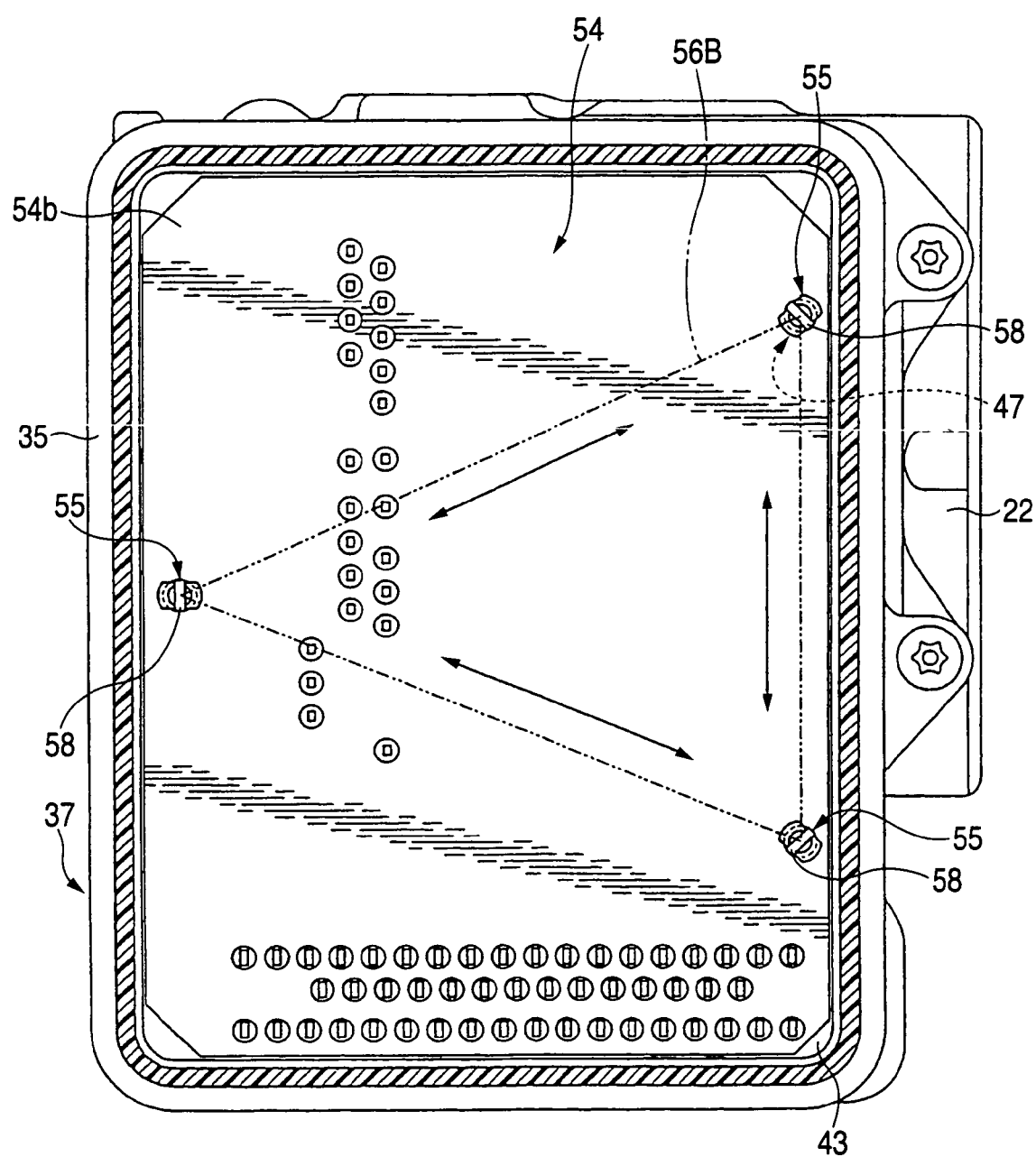
FIG. 7 is a sectional view in correspondence with FIG. 3 of a third embodiment.

FIG. 7 shows a third embodiment of the invention and portions thereof in correspondence with those of the first and the second embodiments are attached with the same reference notations.

The control board 54 is provided with a plurality of, for example, three of the attaching holes 57 . . . to dispose at respective corners of an imaginary polygon, that is, an imaginary triangle 56B drawn on the control board 54 and three of the support bosses 55 . . . elastically engaged with the attaching holes 57 . . . are provided at the wall portion 43 of the first resin mold member 35 in attitudes of avoiding the split grooves 58, 58 of pairs of the support bosses 55, 55 disposed at two ends of straight lines connecting the corners of the imaginary triangle 56B from being disposed on the same straight lines.

According to the third embodiment, expansion and contraction of the control board 54 are allowed in directions along straight lines connecting the corners of the imaginary triangle 56B, that is, in directions along respective sides of the imaginary triangle 56B as shown by arrow marks of FIG.

7 and similar to the first and the second embodiments, the control board 54 can stably be supported without play while preventing excessive load from operating to either of the control board 54 and the first resin mold member 35 by absorbing thermal expansion of the control board 54.

Figure 8:
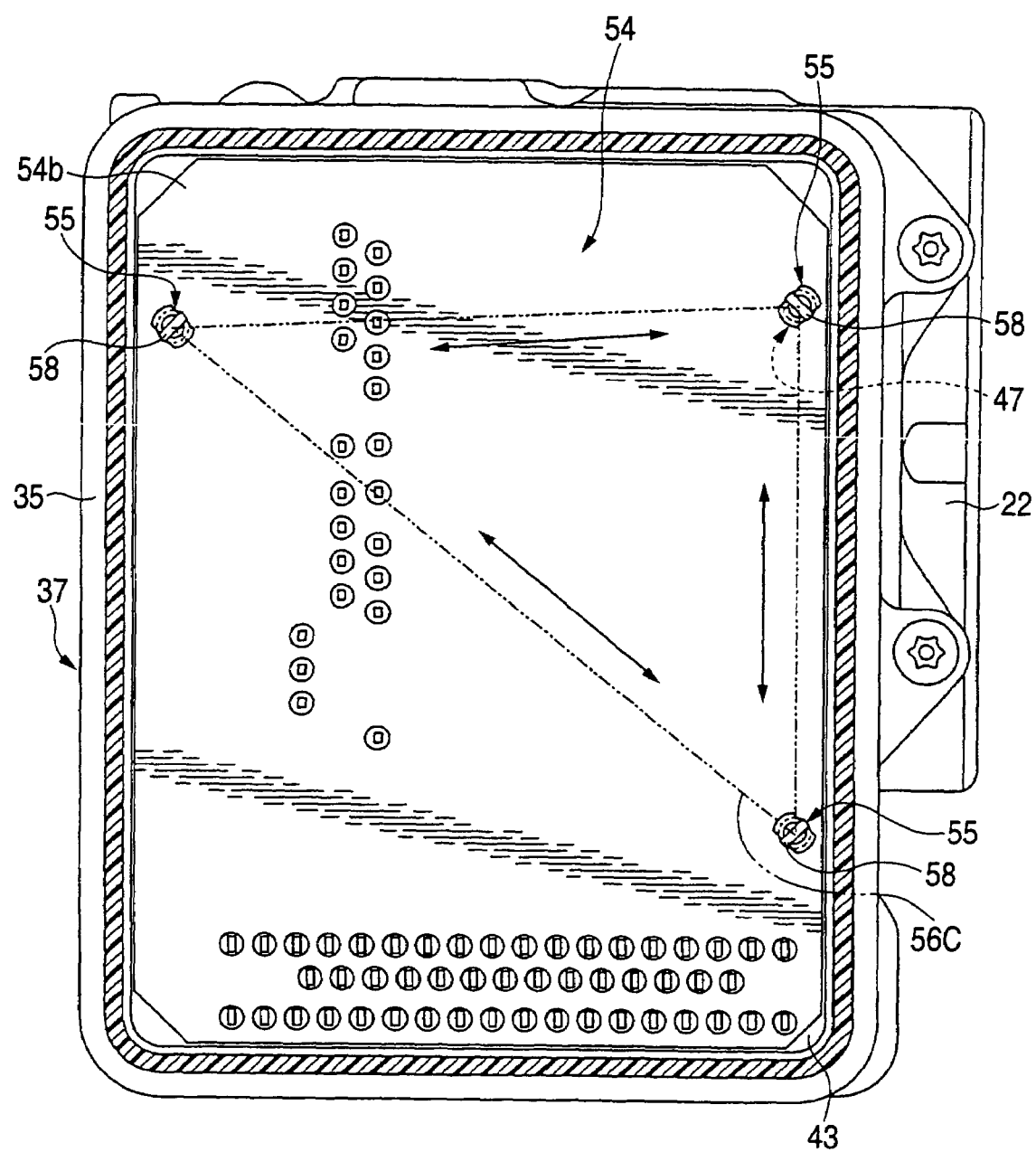
FIG. 8 is a sectional view in correspondence with FIG. 3 of a fourth embodiment.

FIG. 8 shows a fourth embodiment of the invention and portions thereof in correspondence with those of the respective embodiments are attached with the same reference notations.

The control board 54 is provided with a plurality of, for example, three of the attaching holes 57 . . . to dispose at respective corners of an imaginary polygon, for example, an imaginary triangle 56C drawn on the control board 54 and three of the support bosses 55 . . . elastically engaged with the respective holes 57 . . . are provided at the wall portion 43 of the first resin mold member 35 in attitudes of avoiding the split grooves 58, 58 of pairs of the support bosses 55, 55 disposed at two ends of straight lines connecting respective corners of the imaginary triangle 56C from being disposed on the same straight lines.

According to the fourth embodiment, expansion and contraction of the control board 54 are allowed in directions along straight lines connecting the corners of the imaginary triangle 56C, that is, in directions along respective sides of the imaginary triangle 56C as shown by arrow marks of FIG. 8 and similar to the first and the second embodiments, the control board can stably be supported without play while preventing excessive load from operating to either of the control board 54 and the first resin mold member 35 by absorbing thermal expansion of the control board 54.

Figure 9:
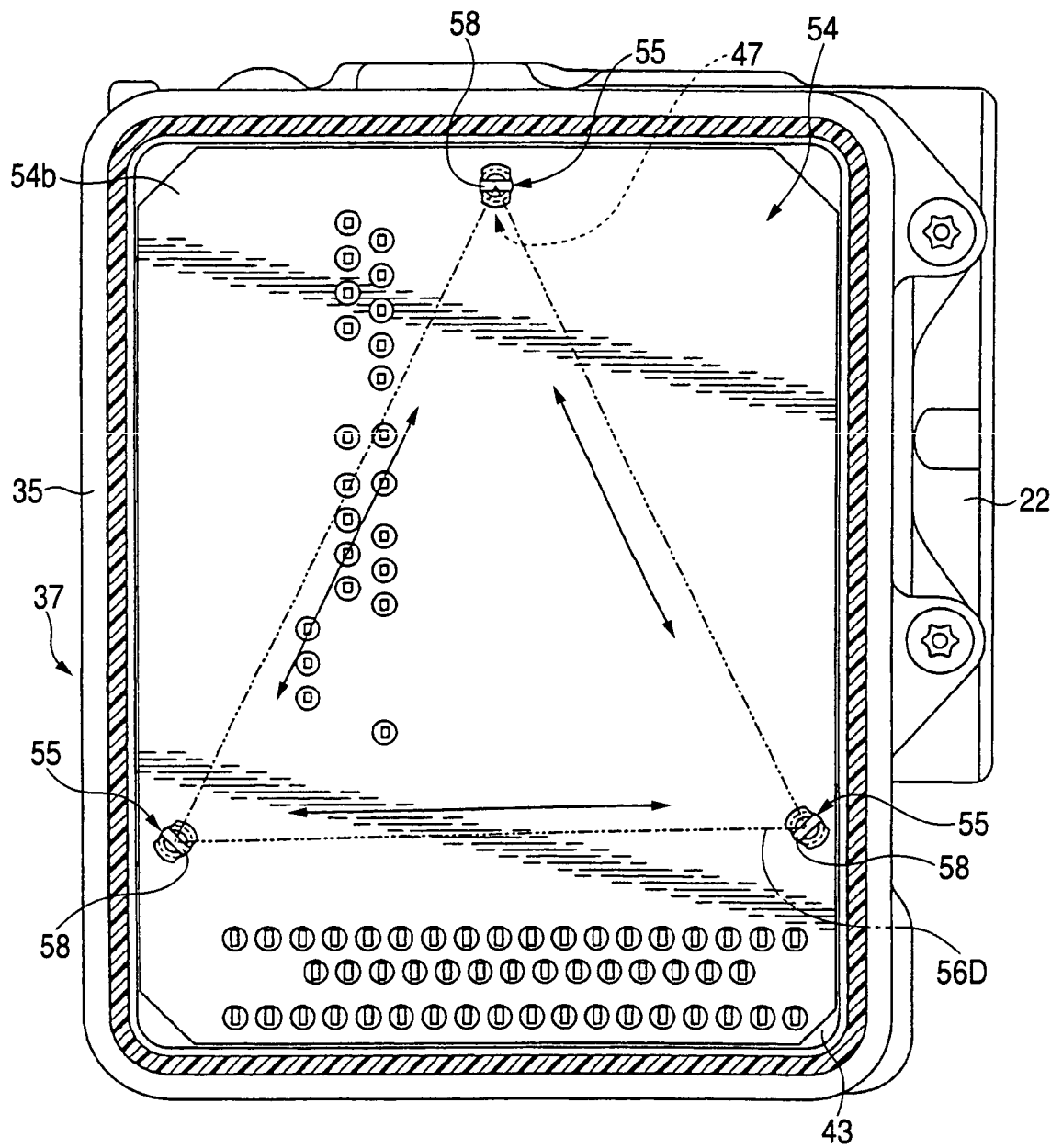
FIG. 9 is a sectional view in correspondence with FIG. 3 of a fifth embodiment.

FIG. 9 shows a fifth embodiment of the invention and portions thereof in correspondence with those of the respective embodiments are attached with the same reference notations.

The control board 54 is provided with a plurality of, for example, three of the attaching holes 57 . . . to dispose at respective corners of an imaginary polygon, that is, an imaginary triangle 56D drawn on the control board 54 and three of the support bosses 55 . . . elastically engaged with the respective attaching holes 57 . . . are attached to the wall portion 53 of the first resin board member 35 in attitudes of avoiding the split grooves 58, 58 of pairs of the support bosses 55, 55 disposed at two ends of straight lines connecting respective corners of the imaginary triangle 56D from being disposed on the same straight lines.

According to the fifth embodiment, expansion and contraction of the control board 54 are allowed in directions along straight lines connecting the corners of the imaginary triangle 56D, that is, in directions along respective sides of the imaginary triangle 56D as shown by arrow marks of FIG. 9 and similar to the first and the second embodiments, the control board 54 can stably be supported without play while preventing excessive load from operating to either of the control board 54 and the first resin mold member 35 by absorbing thermal expansion of the control board 54.

Figure 10:
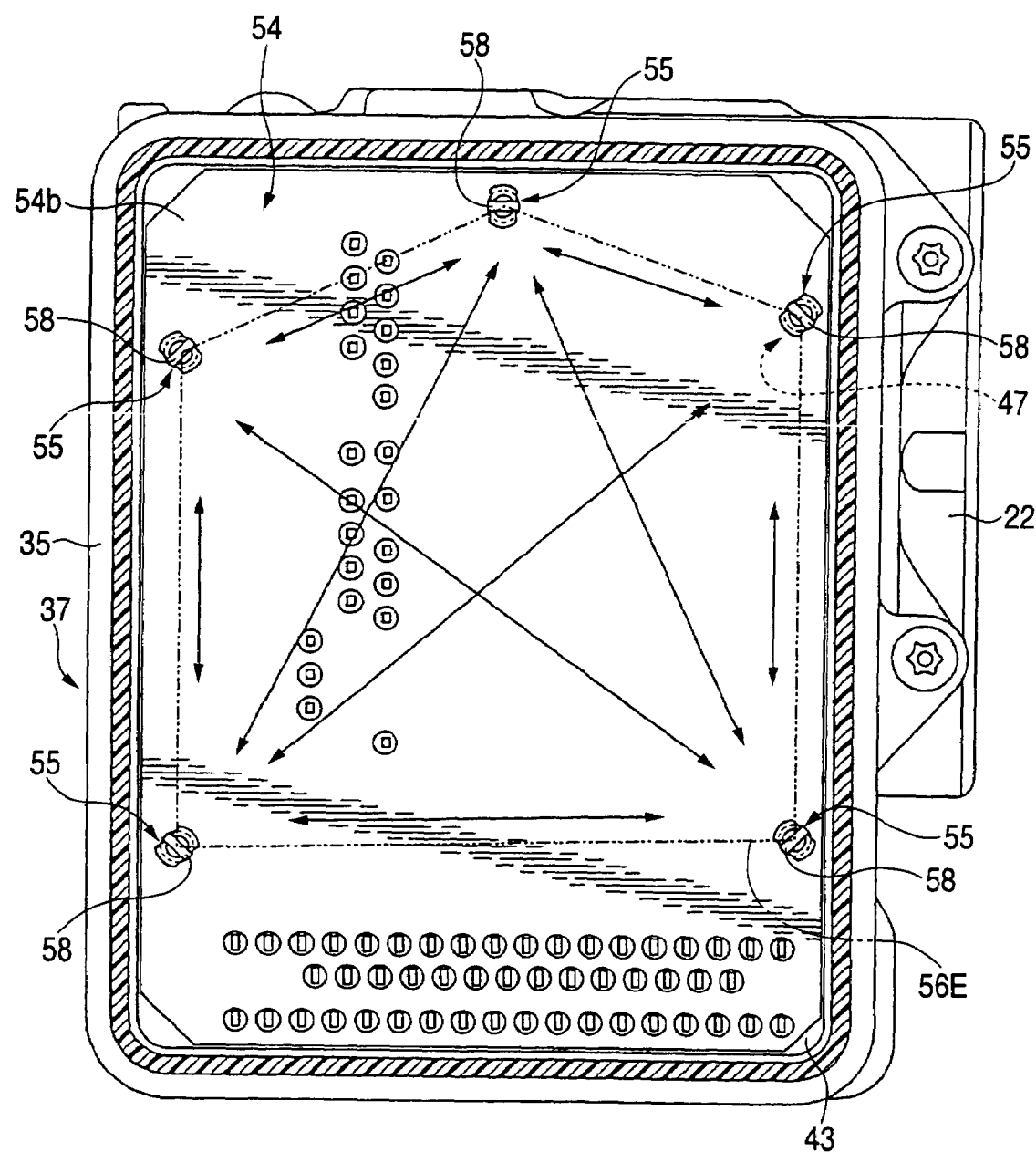
FIG. 10 is a sectional view in correspondence with FIG. 3 of a sixth embodiment.

FIG. 10 shows a sixth embodiment of the invention and portions thereof in correspondence with those of the respective embodiments are attached with the same reference notations.

The control board 54 is provided with a plurality of, for example, five of the attaching holes 57 . . . to dispose at respective corners of an imaginary polygon, for example, an imaginary pentagon 56E drawn on the control board 54 and five of the support bosses 55 . . . elastically engaged with the respective attaching holes 57 . . . are provided at the wall portion 43 of the first resin mold member 35 in attitudes of avoiding the split grooves 58, 58 of pairs of the support bosses 55, 55 disposed at two ends of straight lines connecting respective corners of the imaginary pentagon 56E from being disposed on the same straight lines.

According to the sixth embodiment, expansion and contraction of the control board 54 are allowed in directions along straight lines connecting corners of the imaginary pentagon 56E, that is, in directions along respective sides and respective diagonal lines of the imaginary pentagon 56E as shown by arrow marks of FIG. 10 and similar to the above-described respective embodiments, the control board 54 can stably be supported without play while preventing excessive load from operating to either of the control board 54 and the first resin mold member 35 by absorbing thermal expansion of the control board 54.

Although an explanation has been given of the embodiments of the invention as described above, the invention is not limited to the above-described embodiments but various design changes can be carried out without being deviated from the invention described in the scope of claims.

As described above, according to the invention, excessive load can be prevented from operating to either of the control board and the supporting member by absorbing thermal expansion when the control board is thermally expanded while stably supporting the control board without play at ordinary temperature.

What is claimed is:

1. A support structure of a control board comprising:
a control board including a plurality of attaching holes disposed at respective corners of an imaginary polygon;
a support member made of a synthetic resin for supporting the control board;
a plurality of support bosses disposed on the support member in correspondence with the respective attaching holes, the plurality of support bosses each having a support portion in contact with one face of the control board, and an engaging portion inserted into the respective attaching hole and engaged with another face of the control board; and
each of the support bosses being integrally formed with the support member and allowing for expansion and contraction movement of the control board relative to the support member,
wherein each of the engaging portions is formed with a split groove in a shape of a straight line opened at a front end thereof, each split groove is arranged between engaging members, and the respective support bosses are provided at the support member by avoiding alignment between at least two of the split grooves of the support bosses disposed at two ends of straight lines connecting corners of the imaginary polygon, and
wherein the split grooves are arranged so as not to be parallel to each other.

2. A support structure of a control board comprising:
a control board including a plurality of attaching holes disposed at respective corners of an imaginary polygon;
a support member made of a synthetic resin for supporting the control board; and
a plurality of support bosses disposed on the support member in correspondence with the respective attaching holes, the plurality of support bosses each having a support portion in contact with one face of the control board, and an engaging portion inserted into the respective attaching hole and engaged with another face of the control board,
wherein each of the engaging portions is formed with a split groove in a shape of a straight line opened at a front end thereof and the respective support bosses are provided at the support member by avoiding the split grooves of the support bosses disposed at two ends of straight lines connecting corners of the imaginary polygon from being disposed on the same straight lines, wherein the imaginary polygon is quadrangle, when notations P1, P2, P3 and P4 are attached at positions of the respective corners of the imaginary quadrangle on the control board successively in a peripheral direction, the support boss at the corner position P1 is provided on the support member in an attitude by which the split groove is made to be orthogonal to a diagonal line connecting the corner positions P1 and P3, the support boss at the corner position P2 is provided on the support member in an attitude by which the split groove is made to be orthogonal to a diagonal line connecting the corner positions P2 and P4, the support boss at the corner position P3 is provided on the support member in an attitude by which the split groove is made to be along a straight line connecting the corner positions P2 and P3 or a straight line connecting the corner positions P3 and P4, and the support boss at the corner position P4 is provided on the support member in an attitude by which the split groove is made to be along a straight line connecting the corner positions P4 and P1 or a straight line connecting the corner positions P3 and P4.

3. The support structure of a control board as set forth in claim 1, wherein the imaginary polygon is quadrangle, four of support bosses are provided on the support member in attitudes of avoiding the split grooves of pairs of the support bosses disposed at two ends of straight lines connecting the respective corners of the imaginary quadrangle from being disposed on the same straight lines.

4. The support structure of a control board as set forth in claim 1, wherein the imaginary polygon is triangle, three of the support bosses are provided on the support member in attitudes of avoiding the split grooves of pairs of the support bosses disposed at two ends of straight lines connecting the corners of the imaginary triangle from being disposed on the same straight lines.

5. The support structure of a control board as set forth in claim 1, wherein the imaginary polygon is pentagon, five of the support bosses are provided on the support member in attitudes of avoiding the split grooves of pairs of the support bosses disposed at two ends of straight lines connecting respective corners of the imaginary pentagon from being disposed on the same straight lines.

6. A support structure of a control board comprising:

a control board including a plurality of attaching holes disposed at respective corners of an imaginary polygon;

a support member made of a synthetic resin for supporting the control board; and a plurality of support bosses arranged on the support member in correspondence with the respective attaching holes;

each support boss having a support portion arranged to contact with one face of the control board and an engaging portion inserted into the respective attaching hole and engaged with another face of the control board;

each engaging portion comprising an upper end having a groove arranged between portions that deflect towards each other when the board is connected with the support member; and the grooves of at least two of the support bosses being arranged on adjacent corners of the imaginary polygon are oriented in a non-parallel manner so as to allow for expansion and contraction movement of the control board relative to the support bosses, wherein each of the support bosses are integrally formed with the support member and allow for expansion and contraction movement of the control board relative to the support member.

7. The support structure of a control board set forth in claim 6, wherein the support structure is arranged on a brake hydraulic pressure control apparatus.

* * * * *

UNITED STATES PATENT AND TRADEMARK OFFICE
CERTIFICATE OF CORRECTION

PATENT NO. : 7,075,780 B2  
APPLICATION NO. : 10/612413  
DATED : July 11, 2006  
INVENTOR(S) : Motoyasu Nakamura Page 1 of 1

It is certified that error appears in the above-identified patent and that said Letters Patent is hereby corrected as shown below:

At column 14, line 36 (claim 7, line 1) of the printed patent, "The support structure of a control board set forth in" should be --The support structure of a control board as set forth in--

Signed and Sealed this

Tenth Day of June, 2008

JON W. DUDAS  
*Director of the United States Patent and Trademark Office*